United States Patent Office 3,076,804
Patented Feb. 5, 1963

3,076,804
2-(N,N-DI-LOWERALKYL - AMINO-LOWERALKYL)-
1 - [PYRIDYL - METHYLIDENE] - INDENE AND
PROCESS
Charles Ferdinand Huebner, Chatham, N.J., assignor to
Ciba Corporation, a corporation of Delaware
No Drawing. Filed Feb. 10, 1959, Ser. No. 792,263
8 Claims. (Cl. 260—240)

The present invention relates to tertiary amino-lower alkyl-indenes. Primarily, it concerns 3-[(2-pyridyl)-lower alkyl]-2-(tertiary amino-lower alkyl)-indenes, the salts and quaternary ammonium compounds thereof.

A 2-pyridyl residue is preferably unsubstituted or may be substituted by lower aliphatic hydrocarbon radicals, such as lower alkyl, e.g. methyl or ethyl, or by lower aliphatic hydrocarbonoxy radicals, such as lower alkoxy, e.g. methoxy or ethoxy. The lower alkyl radical of the (2-pyridyl)-lower alkyl group, which connects the 2-pyridyl portion with the indene nucleus, is represented, for example, by a lower alkylene radical having from one to seven carbon atoms, e.g. methylene, 1,1-ethylene, 1,2-ethylene, 1,1-propylene, 1,2-propylene, 1,3-propylene, 2,2-propylene, 1,1-butylene, 2,2-butylene, 2,3-butylene, 1,4-butylene, etc.

The lower alkyl portion of the tertiary amino-lower alkyl group, attached to the 2-position of the indene nucleus, may be represented by a lower alkylene radical containing from one to seven carbon atoms; such alkylene radicals are, for example, methylene, 1,2-ethylene, 1-methyl-1,2-ethylene, 2-methyl-1,2-ethylene, 1,3-propylene, 1-methyl-1,3-propylene, 1,4-butylene, 1-methyl-1,4-butylene, or 1,5-pentylene. The lower alkylene radical or part of it may also be incorporated into a heterocyclic ring system, such as a saturated heterocyclic ring system, containing the tertiary amino group as a ring member. Preferably, the lower alkyl portion of the tertiary amino-lower alkyl group separates the basic tertiary amino group from the 2-position of the indene nucleus by two to three carbon atoms.

Tertiary amino groups are, for example, N,N-di-lower hydrocarbon-amino or N,N-lower alkylene-imino groups. Lower hydrocarbon radicals of an N,N-di-lower hydrocarbon-amino group are, for example, lower alkyl, lower alkenyl, lower cycloalkyl, monocyclic carbocyclic aryl or monocyclic carbocyclic aryl-lower alkyl radicals containing from one to seven carbon atoms, e.g. methyl, ethyl, propyl, isopropyl, butyl, isobutyl, pentyl, neopentyl, allyl, methallyl, cyclopentyl, cyclohexyl, phenyl or benzyl. These hydrocarbon radicals may contain further substituents; free hydroxyl or lower alkoxy groups, e.g. methoxy or ethoxy, may be mentioned as examples of such substituents. Thus, N,N-di-lower hydrocarbon-amino groups are represented, for example, by N,N-dimethylamino, N-methyl-N-ethyl-amino, N,N-diethylamino, N,N-dipropylamino, N,N-diisopropylamino, N-methyl-N-cyclopentyl-amino or N-methyl-N-benzylamino groups. The lower alkylene radicals of an N,N-lower alkyleneimino group contain from four to six carbon atoms which may be arranged in a carbon atom chain, or such carbon atom chain may be interrupted by a hetero atom such as nitrogen, sulfur or oxygen, and thus form a lower aza-, thia- or oxa-alkyleneradical. Together with the nitrogen atom such alkylene radicals represent, for example, pyrrolidino radicals, e.g. pyrrolidino or 2-methyl-pyrrolidino; piperidino radicals, e.g. piperidino, 2-methyl-piperidino, 4-methyl-piperidino, 3-hydroxy-piperidino, 3-acetoxy-piperidino or 3-hydroxymethyl-piperidino; hexamethyleneimino, morpholino, thiamorpholino or piperazino radicals, e.g. 4-methyl-piperazino, 4-hydroxyethyl-piperazino or 4-acetoxyethyl-piperazino. The tertiary amino-lower alkyl radicals may also be represented by a heterocyclic or a heterocyclic lower alkyl radical, in which the tertiary amino group is part of the heterocycle, which is connected through one of its ring carbon atoms directly or through a lower alkylene radical, e.g. methylene or 1,2-ethylene, with the 2-position of the indene ring. Such radicals are represented, for example, by a 1-methyl-piperidino-3-methyl or a 1-methyl-4-piperidino radical.

The 1-position of the indene nucleus is preferably unsubstituted, or, if substituted, contains a hydrocarbon radical, particularly lower alkyl, e.g. methyl; or monocyclic aryl-lower alkyl, e.g. benzyl.

The aromatic portion of the indene nucleus may be unsubstituted or may contain at least one substituent in any of the four positions available for substitution. Such substituents may be, for example, lower alkyl, e.g. methyl or ethyl; hydroxyl; etherified hydroxyl, such as lower alkoxy, e.g. methoxy or ethoxy, or lower alkylenedioxy, e.g. methylenedioxy; esterified hydroxyl, e.g. methoxycarbonyloxy, ethoxy-carbonyloxy or acetoxy, or halogen, e.g. fluorine, chlorine or bromine; mercapto; etherified mercapto, such as lower alkyl-mercapto, e.g. methylmercapto or ethylmercapto; nitro; amino, such as primary amino, or tertiary amino, for example, N,N-di-lower alkyl amino, e.g. dimethylamino.

Salts of the compounds of this invention are, particularly, therapeutically acceptable acid addition salts with inorganic acids, such as mineral acids, for example, hydrohalic acids, e.g. hydrochloric or hydrobromic acid; sulfuric or phosphoric acids; or with organic acids, such as lower aliphatic monocarboxylic acids, e.g. formic, acetic, propionic, glycolic, lactic, pyruvic or similar acids; lower aliphatic dicarboxylic acids, e.g. oxalic, malonic, succinic, maleic, hydroxymaleic, dihydroxymaleic, fumaric, malic, tartaric, citric, or similar acids; monocyclic or bicyclic carbocyclic aryl-carboxylic or carbocyclic aryl-lower aliphatic carboxylic acids, e.g. benzoic, cinnamic, mandelic, salicylic, 4-amino-salicylic, 2-phenoxybenzoic, 2-acetoxybenzoic, or similar acids; monocyclic or bycyclic carbocyclic aryl-dicarboxylic acids, e.g. phthalic or similar acids; organic sulfonic acids, e.g. methane sulfonic, ethane sulfonic, hydroxyethane sulfonic, benzene sulfonic, toluene sulfonic or similar acids; or amino acids, e.g. methionine, tryptophane, lysine, arginine, aspartic, glutamic or hydroxyglutamic acid. Particularly useful are the salts with lower aliphatic dicarboxylic acids, especially unsaturated lower aliphatic dicarboxylic acids, e.g. maleic, hydroxymaleic, dihydroxymaleic, or fumaric acid; or the hydroxy-lower aliphatic dicarboxylic acids, e.g. malic, tartaric or citric acid. Salts, which may be prepared primarily for identification purposes, are particularly those with acidic organic nitro compounds, e.g. picric, picrolonic or flavianic acid; or metal complex acids, e.g. phosphotunstic, phosphomolybdic, chloroplatinic or Reinecke acid.

Quaternary ammonium compounds of the indene derivatives of this invention may be either mono- or polyquaternary ammonium compounds depending on the conditions of the quaternization reaction and/or the number of tertiary amino groups present. Quaternary ammonium compounds are particularly those with aliphatic halides or sulfonates, such as lower alkyl halides, e.g. methyl chloride, methyl bromide, methyl iodide, ethyl bromide or propyl chloride; or lower alkyl lower alkane sulfonates, e.g. methyl methane sulfonate or methyl ethane sulfonate. Also included as quaternary ammonium compounds are the corresponding quaternary ammonium hydroxides, or the salts of such hydroxides with acids, particularly with the organic acids mentioned hereinabove.

Depending on the number of asymmetric carbon atoms the indene compounds of this invention may be obtained as mixtures of racemates, racemates or antipodes, the separation of which will be discussed and illustrated hereinbelow.

The new compounds of this invention show antihistaminic effects and are intended to be used, for example, as antihistaminic agents to relieve disorders, especially those caused by an excess of histamine, such as hay fever, urticaria, allergies caused by food or plant pollen, etc. Especially valuable with respect to their antihistaminic activity are the 2-(N,N-di-lower alkyl-amino-lower alkyl)-3-[(2-pyridyl)-lower alkyl]-indenes, in which the aromatic portion of the indene nucleus is unsubstituted or may contain one or several of the previously mentioned substituents, particularly methyl, methoxy, chlorine or bromine, and the therapeutically useful acid addition salts thereof. This group of compounds may be represented by 2-(N,N-di-lower alkyl-amino-lower alkyl)-3[(2-pyridyl)-($R_1$)methyl]-indenes, in which $R_1$ represents hydrogen or lower alkyl, particularly methyl, and the N,N-di-lower alkyl-amino group is separated from the indene nucleus by two to three carbon atoms, and in which the aromatic portion of the indene nucleus is preferably unsubstituted or may contain one or several of the previously mentioned substituents, particularly methyl, methoxy, chlorine or bromine, and the therapeutically acceptable salts with mineral acids or lower aliphatic dicarboxylic acids. Such compounds are, for example, the 2-(N,N-di-lower alkyl-amino-lower alkyl)-3-[1-(2-pyridyl)-ethyl]-indenes, in which the N,N-di-lower alkyl-amino group is separated from the indene ring by two to three carbon atoms; an outstanding member of this series of indene compounds is the 2-(2-dimethylamino-ethyl)-3-[1-(2-pyridyl)-ethyl]-indene of the formula:

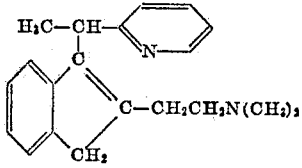

and the salts with hydrohalic acids, unsaturated lower aliphatic dicarboxylic, e.g. maleic acid, and hydroxy-lower aliphatic-dicarboxylic acids, e.g. tartaric acid.

Included within the scope of this invention, are furthermore, the 3-[(4-pyridyl)-lower alkyl]-2-(tertiary amino-lower alkyl)-indenes, in which the pyridyl and the lower alkyl radical of the (4-pyridyl)-lower alkyl group have the above-given meaning, the tertiary amino-lower alkyl group is represented by the above-given examples, and in which the aromatic portion of the indene nucleus is unsubstituted or substituted as previously demonstrated, and the salts and quaternary ammonium compounds thereof. These compounds exhibit antihistaminic effects and may be used as antihistaminic agents to relieve disorders, particularly those caused by an excess of histamine, such as hay fever, urticaria, allergies caused by food or plant pollen, etc. A similar activity is shown by the corresponding 3-[(3-pyridyl)-lower alkyl]-2-(tertiary amino-lower alkyl)-indenes, in which the tertiary amino-lower alkyl portion has the above-given meaning, the aromatic portion of the indene nucleus is unsubstituted or substituted as indicated above, and the pyridyl group may be unsubstituted or substututed as shown hereinabove, and in which the carbon atom of the lower alkyl chain of the (3-pyridyl)-lower alkyl portion, which is connected to the 3-pyridyl nucleus, is preferably unbranched, and salts and quaternary ammonium compounds thereof.

The new compounds of this invention may be used as medicaments in the form of pharmaceutical preparations, which contain the new indene derivatives, including the racemates or antipodes, the salts or the quaternary ammonium compounds thereof in admixture with a pharmaceutical organic or inorganic, solid or liquid carrier suitable for enteral, e.g. oral, or parenteral administration.

To relieve allergic skin troubles, they may also be employed topically. For making up the preparations there can be employed substances which do not react with the new compounds, such as water, gelatine, lactose, starches, magnesium stearate, talc, vegetable oils, benzyl alcohols, gums, polyalkylene glycols or any other known carrier for medicaments. The pharmaceutical preparations may be in the solid form, for example, as capsules, tablets or dragees, in liquid form, for example, as solutions, e.g. isotonic saline solutions, or as suspensions or emulsions, or in the form of salves or creams for topical administration. If desired, they may contain auxiliary substances, such as preserving agents, stabilizing agents, wetting or emulsifying agents, salts for varying the osmotic pressure or buffers, etc. They may also contain, in combination, other therapeutically useful substances.

The indene compounds of this invention may be prepared according to several procedures, the selection of which may also be determined by the nature of the lower alkylene radical linking the pyridyl portion to the indene nucleus.

Preferably, the compounds of this invention may be obtained by introducing a (2-pyridyl)-lower alkyl radical into a 2-(tertiary amino-lower alkyl)-indan-1-one compound or a salt thereof, and, if desired, converting a resulting salt into the free compound and/or, if desired, converting a free compound into a salt or a quaternary ammonium compound thereof.

For example, a 2-(tertiary amino-lower alkyl-indan-1-one may be reacted with a (2-pyridyl)-lower alkyl metal compound, in which the metal is selected from metal elements of group Ia of the periodic system, i.e. the alkali metals, such as sodium, potassium or, preferably, lithium. The reaction is carried out in the presence of an inert solvent, for example, a hydrocarbon, such as an aliphatic hydrocarbon, e.g. hexane, or an aromatic hydrocarbon, e.g. benzene, toluene or xylene, or in an ether, such as a di-lower alkyl ether, e.g. diethylether, or a cyclic ether, e.g. tetrahydrofuran. If desired, the reaction mixture may be cooled, or the temperature may be elevated, for example, to the boiling temperature of the solvent. The reaction is preferably performed in the atmosphere of an inert gas, e.g. nitrogen.

The above-mentioned (2-pyridyl)-lower alkyl metal compounds, particularly the lithium compounds, may be formed by reacting a 2-lower alkyl-pjyridine with an aryl metal, particularly a phenyl lithium, compound, or with an aliphatic hydrocarbon metal compound, particularly a lower alkyl lithium compound, e.g., n-butyl lithium, in a solvent, such as a lower aliphatic hydrocarbon, e.g. hexane; an aromatic hydrocarbon, e.g. benzene, toluene or xylene; or an ether, such as a di-lower alkyl ether, e.g. diethylether, or a cyclic ether, e.g. tetrahydrofuran, preferably in the atmosphere of an inert gas, e.g. nitrogen.

If (2-pyridyl)-lower alkyl radicals are introduced, in which the lower alkyl radical contains more than one carbon atom, the (2-pyridyl)-lower alkyl radical is preferably attached to the indene nucleus through the carbon atom of the lower alkyl radical, which is directly attached to the 2-pyridyl nucleus; for example, 2-ethyl-pyridine, when reacted in the form of its lithium compound, furnishes the 1-(2-pyridyl)-ethyl radical. This procedure is, therefore, especially suitable for the preparation of the 3-[(2-pyridyl)-($R_1$)methyl]-2-(tertiary amino-lower alkyl)-indenes, in which the radical $R_1$ represents hydrogen or, particularly lower alkyl, such as methyl.

The above reaction of indan-1-one compounds with (2-pyridyl)-lower alkyl metal derivatives may furnish directly the desired 3-[(2-pyridyl)-lower alkyl]-2-(tertiary amino-lower alkyl)-indenes, as the intermediarily formed 1-[(2-pyridyl)-lower alkyl]-2-(tertiary amino-lower alkyl)-indan-1-ols may lose water under the conditions of the reaction and form the desired indene derivatives of this invention, particularly, if during the isolation procedure of the reaction product acidic conditions are used. A dehydration of the intermediate indan-1-ol compounds, if necessary, may also be achieved, for example, by treatment with an acid reagent, for example, a mineral acid, such as a hydrohalic acid, e.g. hydrochloric acid, or sulfuric acid, if desired, in the presence of water and/or an organic solvent such as, for example, glacial acetic acid, or with an organic acid, e.g. oxalic or p-toluene sulfonic acid; an anhydride, e.g. acetic acid anhydride; or an acid halide, e.g. phosphorus oxychloride or acetyl chloride, if desired, in an organic base, e.g. pyridine, and, if necessary, with heating.

This procedure may also be suitable for the preparation of the 3-[(4-pyridyl)-lower alkyl]-2-(tertiary amino-lower alkyl)-indenes, mentioned hereinbefore to have antihistaminic properties. Thus, when a 2-(tertiary amino-lower alkyl)-indan-1-one is reacted with a (4-pyridyl)-lower alkyl metal compound, in which the metal is selected from the previously mentioned group of metals, according to the aforementioned procedure, the desired 3-[(4-pyridyl) lower alkyl]-2-(tertiary amino-lower alkyl)-indenes can be obtained directly or after dehydration of any intermediarily formed 1-[(4-pyridyl)-lower alkyl]-2-(tertiary amino-lower alkyl)-indan-1-ol, which dehydration may be carried out as outlined hereinbefore.

The 2-(tertiary amino-lower alkyl)-indan-1-one compounds used as the starting materials in the above reaction are known or, if new, may be prepared according to methods used for manufacturing known analogs. For example, an α-benzyl-malonic acid ester, such as a lower alkyl, e.g. ethyl, or a heterocyclic, e.g. tetrahydropyranyl, ester, in which the benzyl portion may be unsubstituted or substituted as outlined hereinabove, may be reacted with a reactive ester formed by a tertiary amino-lower alkanol, in which the tertiary amino group is separated from the hydroxyl group by at least two carbon atoms, and a strong inorganic or organic acid, such as, for example, a mineral acid, e.g. hydrochloric, hydrobromic, hydriodic or sulfuric acid, or a salt thereof, to produce an α-benzyl-α-(tertiary amino-lower alkyl)-malonic acid ester, in which the tertiary amino group is separated from the α-carbon atom by at least two carbon atoms. This condensation reaction is preferably carried out in the presence of a base, such as an alkali metal lower alkanoate, e.g. lithium, sodium or potassium methanolate, ethanolate, propanolate, isopropanolate or tertiary butanolate. The resulting malonic acid ester may be cyclized to the 2-(tertiary amino-lower alkyl)-indan-1-one, in which the tertiary amino group is separated from the indan-1-one nucleus by at least two carbon atoms. This cyclization may be carried out prior or after hydrolysis of the ester groups, for example, under alkaline conditions, such as in the presence of an aqueous alkali metal hydroxide, e.g. sodium or potassium hydroxide, and decarboxylation of a carboxyl group, for example, by heating, if desired, in the presence of a mineral acid, e.g. hydrochloric or sulfuric acid. The cyclization may be carried out, for example, by treatment with a strong Lewis acid, such as a strong mineral acid, e.g. anhydrous hydrofluoric, sulfuric or phosphoric acid, the latter, for example, in the form of polyphosphoric acid, or boron trifluoride, for example, in the form of the etherate, or aluminum chloride.

The 2-(tertiary amino-methyl)-indan-1-ones may be prepared by another route, for example, by reacting indan-1-one with a secondary amine or a salt thereof in the presence of formaldehyde according to the Mannich procedure. Secondary amines furnish the tertiary amino group disclosed hereinbefore; salts thereof are particularly inorganic acid addition salts, for example, salts with mineral acids, e.g. hydrochloric, hydrobromic or sulfuric acid. The formaldehyde may be used in solution, e.g. in an aqueous solution, or as a polymer, for example, as paraformaldehyde, or an acetal, e.g. dimethoxymethane or diethoxyethane. The reaction is preferably carried out in the presence of a solvent, for example, a lower alkanol, e.g. methanol or ethanol, or an aqueous mixture thereof, and if necessary, in the presence of an acid, for example, a mineral acid, e.g. hydrochloric or sulfuric acid. The reaction may be completed by heating, and the resulting 2-(tertiary amino-methyl)-indan-1-one may be isolated as the free base or as the salt thereof.

1-[(2-pyridyl)-lower alkyl]-2-(tertiary amino-lower alkyl)-indan-1-ols, in which the tertiary amino-lower alkyl group has the above-given meaning, and the salts thereof, formed as intermediates in the process for the preparation of the corresponding indenes, may be isolated. They are new and are intended to be included within the scope of this invention. As the previously described corresponding indene compounds, these indan-1-ol derivatives, their salts and quaternary ammonium compounds have anti-histaminic properties and may be used to relieve allergic disorders caused by histamine, such as those hereinabove outlined. Particularly useful are the 1-[(2-pyridyl)-($R_1$)methyl]-2-(N,N-di-lower alkyl-amino-lower alkyl)-indan-1-ols, in which $R_1$ represents hydrogen or lower alkyl, particularly methyl, and the N,N-di-lower alkyl-amino group is separated from the indan-1-ol nucleus by two to three carbon atoms, and in which the aromatic portion of the indan-1-ol nucleus is preferably unsubstituted or may contain one or several of the previously mentioned substituents, particularly methyl, methoxy, chlorine or bromine. The 1-[(2-pyridyl)-lower alkyl]-2-(tertiary amino-lower alkyl)-indan-1-ols may exist as mixtures of the diastereoisomeric racemates, which mixtures may be separated into the racemates, and, if desired, resulting racemates may be resolved into the antipodes according to procedures known in the art.

1-[(4-pyridyl)-lower alkyl]-2-(tertiary amino-lower alkyl)-indan-1-ols, which may be formed as intermediates, if a (4-pyridyl)-lower alkyl is introduced into a 2-(tertiary amino-lower alkyl)-indan-1-one, are new and are intended to be included within the scope of this invention. They show antihistaminic effects and may be used to remedy allergic disorders.

A modification of the general procedure for the preparation of the compounds of this invention, i.e. introduction of the (2-pyridyl)-lower alkyl radical into a 2-(tertiary amino-lower alkyl)-indan-1-one, comprises reacting a 2-(tertiary amino-lower alkyl)-indan-1-one with a (2-pyridyl)-lower alkyl-Grignard reagent, whereby the desired 3-[(2-pyridyl)-lower alkyl]-2-(tertiary amino-lower alkyl)-indene may be obtained directly or after dehydration of an intermediarily formed indan-1-ol compound. A (2-pyridyl)-lower alkyl-Grignard reagent is, for example, a (2-pyridyl)-lower alkyl metal halide compound, in which the metal is selected from those metal elements of the groups IIa and IIb of the periodic system, which are capable of forming organo-metallic compounds. Such metals are, for example, magnesium or zinc. The halogen atom in such a Grignard reagent may be a chlorine, bromine or iodine atom. The reaction of the indan-1-one derivative with the (2-pyridyl)-lower alkyl-Grignard reagent may be carried out in the solvent used for the preparation of the organo-metallic compound, which is preferably diethyl ether, or in another solvent, for example, in another ether, such as an aryl lower alkyl ether, e.g. anisole; or a cyclic ether, e.g. tetra-hydrofuran or p-dioxane; or an organic base, e.g. N-ethylmorpholine or pyridine. Other solvents, which may also be added after the formation of the Grignard reagent and, if desired, after the removal of the solvent used for the formation of the Grignard reagent, are hydrocarbons, such as aromatic hydrocarbons, e.g. benzene, toluene or xylene, or aliphatic hydrocarbons, e.g. pentane or hexane. (2-pyridyl)-lower alkyl magnesium halides, e.g. chlorides or bromides, are the preferred reagents. The reaction may be carried out under cooling, at room temperature, and may be completed by heating, for example, to the boiling point of the solvent. An inert gas, such as nitrogen, may be used to avoid any contact with atmospheric oxygen.

An intermediarily formed indan-1-ol compound may be converted to the desired indene compound directly under the conditions of the reaction or may be treated with a dehydration agent as previously shown.

The above-described procedure, using a (2-pyridyl)-lower alkyl-Grignard reactant, is especially suited for the preparation of those 3-[(2-pyridyl)-lower alkyl]-indene derivatives, in which the lower alkyl group, connecting the 2-pyridyl radical with the indene ring, is not branched at the methylene group attached to the pyridyl radical.

This modification of the general process may also be used for the preparation of 3-[(4-pyridyl)-lower alkyl]-2-(tertiary amino-lower alkyl)-indenes, for example, by reacting a 2-(tertiary amino-lower alkyl)-indan-1-one with a (4-pyridyl)-lower alkyl-Grignard compound according to the above-given procedure. In addition, the method may also be applied for the formation of 3-[(3-pyridyl)-lower alkyl]-2-(tertiary amino-lower alkyl)-indenes by substituting a (3-pyridyl)-lower alkyl-Grignard reagent for the corresponding (4-pyridyl)-lower alkyl derivative.

A second generally applicable process for the manufacture of a more limited group, the 3-[(2-pyridyl)-methyl]-2-(tertiary amino-lower alkyl)-indenes, comprises reacting a 2-(tertiary amino-lower alkyl)-indene containing an unsubstituted methylene group as a ring member in the 5-membered portion of the indene nucleus, with a 2-pyridine carboxaldehyde, dehydrating, if necessary, any intermediarily formed 3-[(2-pyridyl)-hydroxy-methyl]-2-(tertiary amino-lower alkyl)-indene, converting the resulting 1-[(2-pyridyl)-methylidene]-2-(tertiary amino-lower alkyl)-indene to the desired 3-[(2-pyridyl)-methyl]-2-(tertiary amino-lower alkyl)-indene by reduction, and, if desired, carrying out the optional steps.

The reaction of the aldehyde reagent with the 2-(tertiary amino-lower alkyl)-indene compound is carried out according to the conditions used in Claisen condensations, for example, in the presence of a condensing reagent and, preferably, in a solvent. A condensing reagent is particularly an alkali metal salt-forming condensing reagent, such as an alkali metal hydroxide, e.g. lithium, sodium or potassium hydroxide, or an alkali metal lower alkanolate, e.g. lithium, sodium or potassium methanolate, ethanolate, propanolate, isopropanolate or butanolate; these reagents are preferably used in a solvent, such as, for example, a lower alkanol, e.g. methanol, ethanol, propanol, isopropanol or butanol. Similar reagents are, for example, alkali metal hydrides or amides, e.g. lithium, sodium or potassium hydride or amide, which reagents are used in an inert solvent, such as, for example, an ether, e.g. p-dioxane or diethyleneglycol dimethylether; or an aromatic hydrocarbon, e.g. benzene, toluene or xylene. Other non-metallic condensing reagents may be, for example, quaternary ammonium hydroxides, e.g. benzyl-trimethyl-ammonium hydroxide. The reaction may be carried out under cooling, at room temperature or at an elevated temperature and, if necessary, in the amosphere of an inert gas, e.g. nitrogen.

If necessary, any intermediarily formed 3-[(2-pyridyl)-hydroxy-methyl]-2-(tertiary amino-lower alkyl)-indene may be dehydrated acording to previously given methods, for example, by treatment with an acid, such as a mineral acid, e.g. hydrochloric or sulfuric acid.

The resulting 1-[(2-pyridyl)-methylidene]-2-(tertiary amino-lower alkyl)-indene is converted into the desired 3-[(2-pyridyl)-methyl]-2-(tertiary amino-lower alkyl)-indene by reduction. A preferred procedure is represented by the hydrogenation in the presence of a catalyst, such as a palladium catalyst, e.g. palladium on charcoal, whereby care has to be taken that only one mole of hydrogen is absorbed and the pyridine nucleus is not hydrogenated simultaneously. The reduction is carried out in a solvent, preferably in a non-acidic solvent, such as, for example, a lower alkanol, e.g. methanol or ethanol. It may also be carried out with hydrogen in statu nascendi, such as furnished by a metal or a metal amalgam in the presence of a hydrogen donor, e.g. aluminum amalgam in the presence of wet ether, etc.

The product resulting from the reduction procedure may be the desired 3-[(2-pyridyl)-methyl]-2-(tertiary amino-lower alkyl)-indene, or the latter may be obtained after rearrangement of a double bond in the reduction product. Treatment with a mineral acid, e.g. hydrochloric or sulfuric acid, or with a base, such as an alkali metal hydroxide, e.g. sodium or potassium hydroxide, or an alkali metal lower alkanolate, e.g. sodium or potassium methanolate or ethanolate, may bring about the rearrangement of double bond. These rearrangement reagents are preferably used in the presence of solvents, such as, for example, water or lower alkanols or aqueous mixtures thereof, depending on the solubility and/or reactivity of the reagent or the reactant.

The starting materials used in this procedure are known or may be prepared according to known methods. For example, a 2-(tertiary amino-lower alkyl)-indan-1-one can be converted to the corresponding indan-1-ol by reduction, for example, by treatment with catalytically activated hydrogen, such as hydrogen in the presence of a nickel, e.g. Raney nickel, or a palladium, e.g. palladium on charcoal, catalyst; with hydrogen in statu nascendi, such as furnished by a metal or a metal amalgam in the presence of a hydrogen donor, with an alkali metal borohydride, e.g. sodium borohydride; with an alkali metal aluminum hydride, e.g. lithium aluminum hydride, or with an aluminum lower alkoxide in the presence of a lower alkanol according to the Meerwein-Ponndorf-Verley method, for example, with aluminum isopropoxide in isopropanol. A resulting 2-(tertiary amino-lower alkyl)-indan-1-ol is then dehydrated, for example, in the presence of an acid, such as a mineral acid, e.g. hydrochloric or sulfuric acid.

The above-described modification of the general procedure may also be used for the manufacture of 3-[(4-pyridyl)-methyl]-2-(tertiary amino-lower alkyl)-indenes by substituting in the above procedure the 2-pyridine carboxaldehyde by a 4-pyridine carboxaldehyde. The corresponding 3-[(3-pyridyl)-methyl]-2-(tertiary amino-lower alkyl)-indenes may be prepared by treating a 2-(tertiary amino-lower alkyl)-indene, which contains a methylene group as a ring member of the 5-membered portion of the indene nucleus, with a 3-pyridine carboxaldehyde according to the previously described procedure.

The new compounds of this invention may be obtained as mixtures of diastereoisomeric compounds or the salts thereof, which may be separated into the individual racemic compounds, the salts or the quaternary ammonium compounds thereof on the basis of physicochemical differences, such as solubility, for example, by fractionated crystallization, if necessary, of a derivative, e.g. salt or quaternary ammonium compound thereof.

The racemates of the compounds of this invention may be resolved into the optically active d- and l-forms according to procedures known for the resolution of racemic compounds. For example, the free base of a racemic d, l-compound may be dissolved in a lower alkanol, e.g. methanol or ethanol, and one of the optically active forms of an acid containing an asymmetric carbon atom, or a solution thereof, for example, in the same alkanol or in water or in a mixture of such solvents, is then added, whereupon a salt can be isolated, which is formed by the optically active acid with an optically active form of the base. Especially useful as optically active forms of salt-forming acids having an asymmetric carbon atom are D- and L-tartaric acid; the optically active forms of malic, mandelic, camphor sulfonic or quinic acid may also be employed. The free and optically active base may be obtained from the resulting salt according to methods known for the conversion of a salt into a base, for example, as outlined hereinbelow. An optically active base may be converted into a therapeutically useful acid addition salt with one of the acids mentioned hereinbefore, or may be converted into a quaternary ammonium compound as described hereinbelow. The optically active forms may also be isolated by biochemical methods.

The indene compounds of this invention may be obtained in the form of the free bases or as the salts thereof. A salt may be converted into the free base, for example, by reaction with an alkaline reagent, such as an aqueous alkali metal hydroxide, e.g. lithium, sodium or potassium hydroxide; an aqueous alkali metal carbonate, e.g. sodium or potassium carbonate or hydrogen carbonate; aqueous ammonia or ammonia in a lower alkanol, e.g. methanol or ethanol, solution. A free base may be converted into its therapeutically useful acid addition salts by reaction with one of the inorganic or organic acids outlined hereinbefore, for example, by treating a solution of the free base in a lower alkanol, e.g. methanol, ethanol, propanol or isopropanol, an ether, e.g. diethylether, or a lower alkyl lower alkanoate, e.g. methyl or ethyl acetate, or in a mixture of such solvents, with the acid or a solution thereof. The salts may also be obtained as the hemihydrates, monohydrates, sesquihydrates or polyhydrates depending on the conditions used in the formation of the salts. Mono- or poly-salts may be formed according to the conditions used in the procedure for the preparation of the salts and/or the number of salt-forming groups present.

The quaternary ammonium compounds of the indene derivatives of this invention may be obtained, for example, by reacting the tertiary base with an ester formed by a hydroxylated lower hydrocarbon compound and a strong inorganic or organic acid. Hydroxylated lower hydrocarbon compounds contain from one to seven carbon atoms and the esters thereof are more especially those with mineral acids, e.g. hydrochloric, hydrobromic or hydriodic acid, or with strong organic acids, such as lower alkane sulfonic acids, e.g. methane or ethane sulfonic acid. Such esters are specifically lower alkyl halides, e.g. methyl chloride, methyl bromide, methyl iodide, ethyl chloride, ethyl bromide, ethyl iodide, propyl chloride, etc.; or lower alkyl lower alkane sulfonates, e.g. methyl methane sulfonate or methyl ethane sulfonate. The quaternizing reactions may be performed in the presence or absence of a solvent; under cooling, at room temperature or at an elevated temperature; at atmospheric pressure or in a closed vessel under pressure, and, if desired, in the atmosphere of an inert ags, e.g. nitrogen. Suitable solvents are more especially lower alkanols, e.g. methanol, ethanol, propanol, isopropanol, butanol or pentanol; lower alkanones, e.g. acetone or methyl ethyl ketone; or organic acid amides, e.g. formamide or dimethylformamide.

Resulting quaternary ammonium compounds may be converted into the corresponding quaternary ammonium hydroxides, for example, by reacting a quaternary ammonium halide with silver oxide or a quaternary ammonium sulfate with barium hydroxide, by treating a quaternary ammonium salt with an anion exchanger, or by electrodialysis. From a resulting quaternary ammonium base there may be obtained quaternary ammonium salts by reaction with acids, for example, with those outlined hereinbefore for the preparation of the acid addition salts. A quaternary ammonium compound may also be converted directly into another quaternary ammonium salt without the formation of the quaternary ammonium hydroxide; for example, a quaternary ammonium iodide may be reacted with freshly prepared silver chloride to yield the quaternary ammonium chloride, or a quaternary ammonium iodide may be converted into the corresponding chloride by treatment with hydrochloric acid in anhydrous methanol. Quaternary ammonium compounds may also be isolated as hydrates; depending on the conditions for their formation and/or the number of tertiary amino groups present in the molecule mono- or poly-quaternary ammonium compounds may be formed.

The invention also comprises any modification of the process wherein a compound obtainable as an intermediate at any stage of the process is used as starting material and the remaining step(s) of the process is (are) carried out. It also comprises any new intermediates, which may be formed in one of the procedures outlined hereinbefore.

In the process of this invention such starting materials are preferably used which lead to final products mentioned in the beginning as preferred embodiments of the invention.

This is a continuation-in-part application of my application Serial No. 771,225, filed November 3, 1958, now Patent No. 2,970,149, which in turn is a continuation-in-part application of my application Serial No. 754,526, filed August 12, 1958, now abandoned.

The following examples are intended to illustrate the invention and are not to be construed as being limitations thereon. Temperatures are given in degrees centigrade.

*Example 1*

To 650 ml. of a 0.37 molar solution of phenyl lithium in benzene is added dropwise 24 ml. of dry α-picoline under an atmosphere of nitrogen. After one hour, a solution of 10 g. of 2-(2-dimethylaminoethyl)-indan-1-one in 20 ml. of benzene is added while stirring, and the reaction mixture is allowed to stand at room temperature for several days. 50 ml. of water is added while cooling and stirring. The water layer is discarded and the benzene solution extracted with a solution of 20 ml. of concentrated hydrochloric acid in 100 ml. of water.

The acidic extract, containing the 2-(2-dimethylaminoethyl)-1-[(2-pyridyl)-methyl]-indan-1-ol, is heated on the steam bath for one hour, the solution is then cooled, made basic with aqueous ammonia and then extracted with ether. The ether solution is dried over sodium sulfate, the solvent is removed, and the residue is distilled to yield the 2-(2-dimethylaminoethyl)-3-[(2-pyridyl-methyl]-indene, B.P. 168–170°/0.7 mm.

The free base is converted to the dihydrochloride by treatment of an ethanol solution of the former with ethanolic hydrogen chloride and precipitation of the salt with ether. The hydroscopic 2-(2-dimethylaminoethyl)-3-[(2-pyridyl)-methyl]-indene dihydrochloride is recrystallized from a mixture of ethanol and ether, M.P. 175–177°. The corresponding maleate, prepared by treating an ethanol solution of the base with maleic acid, melts at 140° after recrystallization from ethanol.

By treating an acetone solution of the 2-(2-dimethylaminoethyl)-3-[(2-pyridyl)-methyl]-indene with methyliodide the dimethiodide of 2-(2-dimethylaminoethyl)-3-[(2-pyridyl)-methyl]-indene may be obtained.

The starting material may be prepared as follows: 33.2 g. of dihydropyran is slowly added to a stirred mixture of 50 g. of α-benzyl-malonic acid and 0.1 g. of p-toluene sulfonic acid, in 130 ml. of diethylether kept at 30° during the addition of the dihydropyran. The mixture is stirred for an additional 15 minutes, then poured on ice, and the ether phase is extracted with aqueous potassium carbonate. After washing with water and drying over magnesium sulfate, the ether is evaporated under reduced pressure by keeping the temperature below 30° to yield the di-tetrahydropyranyl α-benzyl-malonate. A toluene solution of this ester is gradually added to a 50% toluene solution of 4.86 g. of sodium hydride while heating and stirring for six hours. A solution of 10.8 g. of 2-dimethylaminoethyl chloride in toluene is added dropwise, and the reaction mixture is refluxed for an additional 48 hours. The toluene layer is washed with water, dried over magnesium sulfate and evaporated to yield the di-tetrahydropyranyl α-benzyl-α-(2-dimethylaminoethyl)-malonate; yield: 32.2 g. of crude material.

A mixture of the resulting ester in 180 g. of polyphosphoric acid is stirred at 110–120° during thirty minutes, and then at 150° during an additional twenty minutes. The reaction mixture is cooled, poured into ice-water, the acidic phase is neutralized with potassium carbonate and extracted with ether. The ether solution is washed with 15% aqueous hydrochloric acid, the aqueous layer is neutralized with potassium carbonate and again extracted with ether. After washing with water, drying over magnesium sulfate, the ether is evaporated to yield the 2-(2-dimethylaminoethyl)-indan-1-one, yield: 8 g. of crude material. The hydrochloride of the base melts at 165° after recrystallization from a mixture of ethanol and ether.

*Example 2*

26 g. of 2-ethyl-pyridine is added dropwise with cooling to 20° and in an atmosphere of nitrogen to a stirred solution of 650 ml. of an 0.37 molar solution of phenyl lithium in benzene. After two hours a solution of 10 g. of 2-(2-dimethylaminoethyl)-indan-1-one in 50 ml. of dry ether is added over a period of five minutes while stirring and cooling to room temperature. After standing for twenty-four hours the organo-lithium compounds are decomposed by the addition of 50 ml. of water with external cooling. After separating the water phase from the organic solution, the latter is washed several times with 50 ml. of water, and then extracted with a mixture of 40 ml. of concentrated hydrochloric acid and 100 ml. of water.

The acidic solution, containing the 2-(2-dimethylaminoethyl)-1-[1-(2-pyridyl)-ethyl]-indan-1-ol is heated on the steam bath for thirty minutes to effect dehydration to the desired indene derivative. The solution is cooled, made strongly basic with an aqueous solution of ammonia and then extracted with ether. The ether phase is dried over sodium sulfate, filtered, evaporated and the residue distilled. At 15 mm. pressure the excess of 2-ethyl-pyridine is removed, at 120°/0.5 mm. some unreacted 2-(2-dimethylaminoethyl)-indan-1-one distills and at 165–175°/0.5 mm. the 2-(2-dimethylaminoethyl)-3-[1-(2-pyridyl)-ethyl]-indene is collected. It may be converted to an aqueous solution of the dihydrochloride by dissolving it in the appropriate amount of dilute hydrochloric acid.

*Example 3*

To a solution of 1.0 g. of 2-(2-dimethylaminoethyl)-3-[1-(2-pyridyl)-ethyl]-indene in 10 ml. of ethanol is added while stirring and heating 0.4 g. of maleic acid. On cooling the 2-(2-dimethylaminoethyl)-3-[1-(2-pyridyl)-ethyl]-indene maleate crystallizes, is filtered off, washed with a small amount of ethanol and recrystallized from ethanol, M.P. 158°.

*Example 4*

To 1.0 g. of 2-(2-dimethylaminoethyl)-3-[1-(2-pyridyl)-ethyl]-indene in about 10 ml. of ethanol is added a solution of 0.52 g. of L-tartaric acid in 5 ml. of ethanol. After cooling during a few days in the ice box, a crystalline precipitate is formed, which is filtered off and recrystallized three times from ethanol to obtain complete resolution. The L-tartrate of one of the optically active forms of 2-(2-dimethylaminoethyl)-3-[1-(2-pyridyl)-ethyl]-indene melts at 135–137°; $[\alpha]_D^{25}$—106° (in ethanol). By treating an aqueous suspension of this salt with ammonia and ether an optically active form of 2-(2-dimethylaminoethyl)-3-[1-(2-pyridyl)-ethyl]-indane is obtained, which is converted to the corresponding maleate according to the procedure of Example 3, $[\alpha]_D^{25}$+70° (in ethanol).

*Example 5*

By reacting the lithium compound formed from 22 g. of γ-picoline and phenyl lithium with 10 g. of 2-(2-dimethylaminoethyl)-indan-1-one according to the procedure given in Example 2, the 2-(2-dimethylaminoethyl)-3-[(4-pyridyl)-methyl]-indene, B.P. 165–170°/0.7 mm., is obtained after dehydration of the intermediarily formed 2-(2-dimethylaminoethyl)-1-[(4-pyridyl)-methyl]-indan-1-ol. It can be converted into its maleate according to the procedure described in Example 3.

*Example 6*

To a solution of 3 g. of potassium hydroxide in 100 ml. of methanol is added 7 g. of 2-(2-dimethylaminoethyl)-indene hydrochloride and then 7 ml. of 3-pyridine carboxaldehyde, while stirring and cooling to room temperature. After standing at that temperature over night, the greater part of the solvent is removed by distillation under reduced pressure, water is added and the crude 2-(2-dimethylaminoethyl)-1-[(3-pyridyl)-methylidene]-indene is extracted with ether.

The solvent is removed by distillation and the residue is dissolved in 50 ml. of ethanol and hydrogenated over 0.5 g. of palladium on charcoal (10%) until one mole of hydrogen is absorbed in about one hour. The reaction mixture is filtered, the solvent removed under reduced pressure and the residue dissolved in 10 ml. of benzene. The benzene solution is chromatographed on 100 g. of aluminum oxide (basic, activity I). Cyclohexane elutes the desired 2-(2-dimethylaminoethyl)-3-[(3-pyridyl)-methyl]-indene, which is distilled at 160–170°/0.5 mm. It may be converted into its maleate according to the procedure of Example 3.

The starting material used in the above procedure may be prepared as follows: To a solution of 35 g. of 2-(2-dimethylaminoethyl)-indan-1-one in 100 ml. of ethanol is gradually added 10 g. of sodium borohydride while stirring. The reaction mixture is refluxed for two hours, then the greater part of the ethanol is removed by distillation and the residue diluted with water. The 2-(2-dimethylaminoethyl)-indan-1-ol is extracted with ether and the crude base obtained after removal of the solvent; its picrate melts at 169–170°.

A solution of the crude base iin 350 ml. of glacial acetic acid and 125 ml. of concentrated hydrochloric acid is refluxed for one-half hour, and most of the solvent then distilled under reduced pressure. The residue is diluted with water, made basic with ammonia and extracted with ether. On addition of 6 N ethanolic hydrogen chloride to the ether solution the 2-(2 dimethylaminoethyl)-indene hydrochloride precipitates and is recrystallized from ethanol, M.P. 202–205°.

*Example 7*

To a stirred suspension of 14 g. of lithium in 400 ml. of dry ether is added about 10 ml. of a mixture of 159 g. of bromo-benzene in 200 ml. of dry ether. The reaction is carried out in the atmosphere of nitrogen. The additional bromobenzene solution is given to the reaction in such a rate as to maintain the latter.

A total of 80 g. of 2-ethyl-pyridine, dried over calcium hydride, is then added dropwise at 20° while stirring. After standing at room temperature for four hours an ether solution of 50 g. of 2-(2-dimethylaminoethyl)-indan-1-one is added while stirring and cooling to room temperature, at which temperature the reaction is allowed to stand for three days. After filtration and dilution with ether, the organic solution is washed three times with water and then extracted with 15% aqueous hydrochloric acid.

The acidic solution, containing 2-(2-d'methylaminoethyl)-1-[(2-pyridyl)-ethyl]-indan-1-ol, is heated on the steam bath for one-half hour. After cooling the solution is basified with aqueous ammonia and extracted with ether. The 2-(2-dimethylaminoethyl)-3-[1-(2-pyridyl)-ethyl]-indene is obtained after washing, drying and evaporating the solvent and distillation; yield: 23 g.

*Example 8*

A solution of 17 g. of 2-propyl-pyridine in 50 ml. of ether is added over a period of 15 minutes to a stirred solution of 8 g. of butyl lithium in 50 ml. of hexane in an atmosphere of dry nitrogen. After three hours a solution of 13 g. of 2-(2-dimethylaminoethyl)-indan-1-one in 50 ml. of ether is added over a period of fifteen minutes while stirring. The reaction mixture is allowed to stand for two days at room temperature; 50 ml. of water is then added dropwise, the aqueous layer is separated and the organic phase is extracted with 60 ml. of 6 N aqueous hydrochloric acid.

The acid extract, containing the 2-(2-dimethylaminoethyl)-1-[1-(2-pyridyl)-propyl]-indan-1-ol, is heated on the steam bath for one hour, cooled, basified with aqueous ammonia and extracted with ether. The ether is removed by distillation and the 2-(2-dimethylaminoethyl)-3-[1-(2-pyridyl)-propyl]-indene is distilled, B.P. 165–175°/0.5 mm.

The monomethiodide of 2-(2-dimethylaminoethyl)-3-[1-(2-pyridyl)-propyl]-indene, M.P. 255° (decomposition) after recrystallization from water, is prepared by reacting the free base in ethanol with methyl iodide.

Example 9

50 ml. of an ether solution of phenyl lithium, prepared from 1.75 g. of lithium and 20 g. of bromobenzene according to the procedure described in Example 7, is added dropwise and very slowly over a period of three hours to a stirred solution of 12 g. of 2-isopropyl-pyridine in 25 ml. of ether under an atmosphere of dry nitrogen. After standing an additional two hours, a solution of 15 g. of 2-(2-dimethylaminoethyl)-indan-1-one in 50 ml. of ether is added; the reaction mixture is allowed to stand for one day at room temperature and then worked up as described in Example 8. The dehydration product of the intermediarily formed 2-(2-dimethylaminoethyl)-1-[dimethyl-(2-pyridyl)-methyl]-indane-1-ol, is distilled to distilled to yield the desired 2-(2-dimethylaminoethyl)-3-[dimethyl-(2-pyridyl)-methyl]-indene, B.P. 155–160°/0.4 mm.

The methiodide of 2-(2-dimethylaminoethyl)-3-[dimethyl-(2-pyridyl)-methyl]-indene prepared according to the previously given procedure, melts at 234° (with decomposition) after recrystallization from ethanol.

Example 10

To a stirred solution of 10.7 g. of 2,6-lutidine in 25 ml. of ether in an atmosphere of dry nitrogen is added dropwise and over a period of three hours 50 ml. of an ether solution of phenyl lithium, prepared from 1.75 g. of lithium and 20 g. of bromobenzene according to the procedure described in Example 7, after standing for an additional two hours at room temperature, 15 g. of 2-(2-dimethylaminoethyl)-indan-1-one in 50 ml. of ether is added and the reaction mixture is allowed to stand at room temperature. It is worked up as described in Example 8; the 2-(2-dimethylaminoethyl)-3-[(6-methyl-2-pyridyl)-methyl]-indene, B.P. 150–155°/0.4 mm. is obtained after dehydration of the intermediarily formed 2-(2-dimethylaminoethyl)-1-[(6-methyl-2-pyridyl)-methyl]-indan-1-ol with hydrochloric acid.

Example 11

By reacting the lithium compound of α-picoline with 2-(2-diethylaminoethyl)-indan-1-one according to the procedure of Example 1 the 2-(2-diethylaminoethyl)-1-[(2-pyridyl)-methyl]-indan-1-ol can be obtained, which is dehydrated with aqueous hydrochloric acid, and the resulting 2-(2-diethylaminoethyl)-3-[(2-pyridyl)-methyl]-indene is purified by distillation.

The starting material used in the above reaction may be prepared as follows: To a warm suspension of 22 g. of sodium hydride in 1,000 ml. of toluene is added dropwise while stirring 100 g. of diethyl α-benzyl malonate. The reaction mixture is refluxed for one hour after completion of the addition, then a solution of 70 g. of 2-diethylaminoethyl chloride in toluene is added and the reaction mixture is refluxed overnight. The toluene solution is extracted with aqueous hydrochloric acid, the acidic layer is made basic with aqueous ammonia and the organic material is extracted with ether. The ether solution is washed, dried and evaporated under reduced pressure to yield 136 g. of diethyl α-benzyl-α-(2-diethylaminoethyl)-malonate, the oxalate of which melts at 117–119°.

A mixture of 136 g. of diethyl α-benzyl-α-(2-diethylaminoethyl)-malonate, 65.5 g. of potassium hydroxide, 85 ml. of water and 340 ml. of ethanol is refluxed for 4 hours, then concentrated under reduced pressure. The solid residue is dissolved in a minimum amount of water, the aqueous solution is neutralized with acetic acid while externally cooling and the resulting α-benzyl-α-(2-diethylaminoethyl)-malonic acid is filtered off and washed with ice water and ethanol. After drying under reduced pressure, it melts at 128°; yield: 103 g.

103 g. of α-benzyl-α-(2-diethylaminoethyl)-malonic acid is heated to 180° with occasional stirring until foaming ceases; the decarboxylation is complete after approximately 15 minutes. The resulting melt is cooled and diluted with about 15 ml. of ethanol, ether is added and the 2-benzyl-4-diethylaminobutyric acid crystallizes, M.P. 102–104°; yield: 83 g.

83 g. of 2-benzyl-4-diethylamino-butyric acid is added to 415 g. of polyphosphoric acid kept at 100–120°. The temperature is then raised to 140–145° for about 20 minutes and the acid is decomposed by pouring the reaction mixture into ice water and neutralizing the aqueous solution with potassium carbonate. The 2-(2-diethylaminoethyl)-indan-1-one is extracted with ether, the ether solution is washed and dried and the ether is evaporated. The hydrochloride salt, prepared according to the previously given procedure, melts at 164–166°; yield: 12.3 g.

Example 12

The 5-chloro-2-(2-dimethylaminoethyl)-3-[(2-pyridyl)-methyl]-indene, purified by distillation, may be obtained by treatment of 6-chloro-2-(2-dimethylaminoethyl)-indan-1-one with the lithium compound of α-picoline according to the procedure outlined in Example 1, whereby the intermediarily formed 6-chloro-2-(2-dimethylaminoethyl)-1-[(2-pyridyl)-methyl]-indan-1-ol is dehydrated by heating the acidic extract of the reaction product.

The starting material used in the above reaction may be prepared as follows: 70 g. of diethyl α-(4-chlorobenzyl)-malonate, B.P. 150–151°/0.5 mm., obtained by reacting 4-chlorobenzyl chloride with sodium diethyl malonate, is added to a stirred suspension of 8 g. of sodium hydride in 500 ml. of refluxing toluene. After 2 hours, 34 g. of 2-dimethylaminoethyl chloride is added dropwise and the mixture is refluxed for an additional 12 hours, then cooled and extracted with an excess of hydrochloric acid. The acidic extract is treated with aqueous ammonia and diethyl α-(4-chlorobenzyl)-α-(2-dimethylaminoethyl)-malonate is separated in a separatory funnel. It is characterized as the crystalline exalate which melts at 175–178° after recrystallization from a mixture of ethanol and ether.

The diethyl α-(4-chlorobenzyl)-α-(2-dimethylaminoethyl)-malonate is hydrolyzed with potassium hydroxide as described in Example 4, the resulting α-(4-chlorobenzyl)-α-(2-dimethylaminoethyl)-malonic acid melts at 180–181° after recrystallizing from water. The 2-(4-chlorobenzyl)-4-dimethylamino-butyric acid is obtained by decarboxylating the malonic acid derivative at a temperature of 185° for 5 minutes, and is obtained in crystalline form from ether. It is cyclized as described in Example 11 by treatment with polyphosphoric acid to yield the desired 6-chloro-2-(2-dimethylaminoethyl)-indan-1-one which is converted to its hydrochloride, 175–176°.

Example 13

On heating 1-[(2-pyridyl)-methyl]-2-[2-pyrrolidino-(N)-ethyl]-indan-1-ol, obtained by reacting the lithium compound of α-picoline with 2-[2-pyrrolidino-(N)-ethyl]-indan-1-one according to the procedure of Example 1, with aqueous hydrochloric acid for one hour the 3-[(2- pyridyl)-methyl]-2-[2-pyrrolidino-(N)-ethyl]-indene can be obtained and purified by distillation.

The starting material may be prepared as follows: To a cooled solution of the sodium diethyl α-benzyl-malonate, prepared from 75 g. of diethyl α-benzyl-malonate and 16 g. of a 1:1-mixture of sodium hydride and mineral oil, in 150 ml. of toluene is added a toluene solution of 2-pyrrolidino-(N)-ethyl chloride. This solution is prepared by shaking 61 g. of 2-pyrrolidino-(N)-ethyl chloride hydrochloride in 200 ml. of toluene with 50 ml. of water containing 23 g. of sodium hydroxide, drying the organic solution over potassium hydroxide pellets and using it without further purification. The reaction mixture is heated at 120° for 6 hours while stirring. The organic solvent is then evaporated under reduced pressure and the residue is refluxed for 7 hours with a solution of 40 g. of sodium hydroxide in 200 ml. of water and 300 ml. of ethanol. The mixture is acidified with concentrated aqueous hydrochloric acid and evaporated to dryness under reduced pressure. The remaining residue is heated in an oil bath with the temperature slowly raising at 180° over about one hour; the decarboxylation is complete after 30 minutes heating at this temperature. The mixture is digested with 250 ml. of hot ethanol, the hot solution is filtered and the solvent is evaporated to dryness to give the crystalline 2 - benzyl - 4-pyrrolidino-(N)-butyric acid hydrochloride, M.P. 178–182°.

The resulting acid hydrochloride is added in small quantities while stirring to 400 g. of polyphosphoric acid kept at 100°. The temperature is then raised to 120° and held for 30 minutes; the mixture is then poured onto ice, made alkaline and extracted with ether. After the removal of the organic solvent, the 2 - [2 - pyrrolidino-(N)-ethyl]-indan-1-one is distilled at 148–152°/0.4 mm.

*Example 14*

The reaction of the lithium compound of 2-ethyl-pyridine with 2 - [2 - (4-methyl-1-piperazino)-ethyl]-indan-1-one according to the procedure of Example 7 furnishes the 2-[2-(4-methyl-1-piperazino)-ethyl]-1-[1-(2-pyridyl)-ethyl]-indan-1-ol, which is dehydrated by heating with aqueous hydrochloric acid to the desired 2-[2-(4-methyl-1-piperazino)-ethyl]-3-[1-(2-pyridyl)-ethyl]-indene, purified by distillation.

The starting material may be prepared according to the procedure given in Example 13 by using the same quantities of starting material, and replacing 2-pyrrolidino-(N)-ethyl chloride by 2 - (4 - methyl-1-piperazino)-ethyl chloride. The intermediate 2-benzyl-4-(4-methyl-1-piperazino)-butyric acid hydrochloride melts at 195–200° and is cyclized to the 2 - [2 - (4-methyl-1-piperazino)-ethyl]-indan-1-one, B.P. 168–170/0.4 mm.

*Example 15*

A solution of 2-(2-dimethylaminoethyl)-6-methoxy-indan-1-one in ether is added slowly to an ether solution of the lithium compound of α-picoline under an atmosphere of nitrogen. The reaction mixture is decomposed by the addition of water, the organic material is extracted with ether and the residue of the ether extract, containing the 2-(2-dimethylaminoethyl)-6-methoxy-1-[(2-pyridyl)-methyl]-indan-1-ol, is dehydrated by heating with aqueous hydrochloric acid to yield the 2-(2-dimethylaminoethyl) - 5 - methoxy - 3 - [(2 - pyridyl) - methyl]-indene, which is purified by distillation and may be converted into the maleate according to the procedure of Example 3.

The starting material used in the above reaction may be prepared as follows: To a solution of 16.25 g. of sodium in 288 ml. of ethanol is slowly added 113.5 g. of diethyl malonate at 50°. The clear reaction solution is treated dropwise with 110.7 g. of 4-methoxybenzyl chloride and the reaction mixture is refluxed for one hour. After filtration and evaporation of the solvent, the residue is diluted with water and the oily product is extracted with ether, the ether solution washed and dried, and the solvent evaporated. The diethyl α-(4-methoxybenzyl)-malonate is distilled, B.P. 155–165°/0.75 mm.; yield: 66.7 g.

To a refluxing suspension of 6.1 g. of sodium hydride in 550 ml. of toluene is added dropwise while stirring 66.7 g. of diethyl α-(4-methoxybenzyl)-malonate and the reaction mixture is refluxed for one hour. A solution of 31 g. of 2-dimethylaminoethyl chloride in toluene is added, the reaction mixture heated overnight and the toluene solution then extracted with aqueous hydrochloric acid. The acidic layer is made basic with aqueous ammonia, the organic material is extracted with ether, the ether solution is washed and dried and the solvent evaporated. 77 g. of diethyl α-(4-methoxybenzyl)-α-(2-dimethylaminoethyl)-malonate is obtained and characterized as the hydrochloride salt, 145–147°.

A mixture of 73.4 g. of diethyl α-(4-methoxybenzyl)-α-(2-dimethylaminoethyl)-malonate, 26.8 g. of potassium hydroxide, 30 ml. of water and 148 ml. of ethanol is refluxed for 4 hours and then concentrated under reduced pressure. The solid residue is dissolved in a minimum amount of water and neutralized with acetic acid under external cooling. The resulting α-(4-methoxybenzyl)-α-(2-dimethylaminoethyl)-malonic acid is filtered off, washed with ice water and ethanol and dried under reduced pressure, M.P. 163–165°; yield: 45.5 g.

45.5 g. of α-(4-methoxybenzyl)-α-(2-dimethylaminoethyl)-malonic acid is heated to 180° with occasional stirring until foaming ceases after completion of decarboxylation. The resulting melt is diluted with about 10 ml. of ethanol, ether is added, and the 2-(4-methoxybenzyl)-4-dimethylamino-butyric acid crystallizes, M.P. 87°; yield: 33.7 g.

33.7 g. of 2-(4-methoxybenzyl)-4-dimethylamino-butyric acid is gradually added to 168 g. of polyphosphoric acid kept at 90–120°, and the reaction mixture is heated to 140–150° for 20 minutes. It is then poured into ice water, neutralized with potassium carbonate, and, since no crystalline product is formed, is made strongly basic with 3 N aqueous sodium hydroxide. The organic material is extracted with ether, the ether solution washed and dried and the solvent then evaporated. The resulting 2-(2-dimethylaminoethyl)-6-methoxy-indan-1-one is converted to the hydrochloride, M.P. 225–227°; yield: 14.5 g.

*Example 16*

A solution of 2-(2-dimethylaminoethyl)-indan-1-one in ether is added to a Grignard reagent prepared from 2-pyridyl ethyl bromide and magnesium in ether. The reaction mixture is allowed to stand at 5°; the larger part of the ether is then removed by distillation and the somewhat viscous residue is refluxed for several hours. The mixture is diluted with ether and decomposed with aqueous ammonium chloride. The separated ether solution is evaporated to leave the oily 2-(2-dimethylaminoethyl)-1-[2-(2-pyridyl)-ethyl]-indan-1-ol, which is dehydrated by refluxing with a mixture of acetic acid and concentrated aqueous hydrochloric acid. The acids are then removed by distillation under reduced pressure, the residue is diluted with water, basified and extracted with ether. The ether extract is evaporated to dryness, a few milliliters of benzene are added to the residue, which is chromatographed on aluminum oxide. The 2-(2-dimethylaminoethyl) - 3 - [2 - (2 - pyridyl) - ethyl] - indene can be eluted and may be converted to the maleate.

*Example 17*

The reaction of 2-(2-dimethylaminoethyl)-3-methyl-indan-1-one with the lithium compound of 2-ethylpyridine according to the procedure of Example 7 furnishes the 2 - (2 - dimethylaminoethyl) - 3 - methyl - 1 - [1 - (2 - pyridyl)-ethyl]indan-1-ol, which is dehydrated to the desired 2 - (2 - dimethylaminoethyl) - 1 - methyl - 3 - [1-

(2-pyridyl)-ethyl]indene by treatment with warm aqueous hydrochloric acid.

The starting material used in the above reaction may be prepared as follows: To a solution of 12.3 g. of sodium in 200 ml. of ethanol kept at 50° is slowly added 81 ml. of diethyl malonate, followed by dropwise addition of 100 g. of 1-phenylethyl bromide. The reaction mixture is refluxed for about one hour, the resulting sodium chloride is filtered off and the solvent is evaporated. The residue is distilled to give 83 g. of diethyl α-(1-phenylethyl)-malonate, B.P. 165–170°/18 mm.

The diethyl α-(1-phenylethyl)-malonate is slowly added to a heated suspension of 17.5 g. of sodium hydride (1:1-mixture in mineral oil) in 750 ml. of toluene; the reaction mixture is refluxed for one hour and a toluene solution of 55 g. of 2-dimethylaminoethyl chloride is added. The reaction mixture is refluxed overnight and then extracted with 15% aqueous hydrochloric acid; the acid solution is made basic with ammonia and extracted with ether. The ether is removed to yield 93 g. of the desired diethyl α-(2-dimethylaminoethyl)-α-(1-phenylethyl)-malonate, the oxalate of which melts at 136–138°.

This ester is hydrolyzed by refluxing with 27.7 g. of sodium hydroxide in 45.5 ml. of water and 186 ml. of ethanol for 8 hours. After evaporation of the organic solvent, a minimum amount of water is added to complete solution whereupon the hydrochloride is formed by the addition of concentrated aqueous hydrochloric acid. The water is evaporated under reduced pressure and the residue is treated with boiling ethanol to extract the hydrochloride salt. The separated organic solution is evaporated and the residue is decarboxylated by heating at 150° for 15 minutes and then raising the temperature to 180°–190° until foaming ceases. The non-crystalline residue is dissolved in a minimum amount of hot ethanol and poured onto a suspension of filter-cel in ethanol. The mixture is filtered and added to 600 g. of polyphosphoric acid at a temperature of 85° while vigorously stirring. The reaction temperature is kept at 90–95° during the addition and then raised to 95–100° for 20 minutes. After cooling, it is poured onto ice, the solution is filtered and the filtrate neutralized with potassium carbonate. The desired 2-(2-dimethylaminoethyl)-3-methyl-indan-1-one is extracted with ether and distilled after the evaporation of the organic solvent, B.P. 135°/1 mm.; yield: 31.5 g.

*Example 18*

A solution of 15 g. of dry 2-ethyl-pyridine in 25 ml. of dry benzene is added to a solution of 60 ml. of butyl lithium in hexane (containing 0.154 g. lithium per ml.) under cooling to 25° and in an atmosphere of dry nitrogen. After three hours 12 g. of 2-(2-dimethylamino-2-methyl-ethyl)-indan-1-one in 25 ml. of benzene is added at 25°. The reaction mixture is allowed to stand for seven days at room temperature, 100 ml. of water is added dropwise to decompose the organic lithium salts and the water layer is separated. The remaining organic phase is extracted with 75 ml. of 4 N aqueous hydrochloric acid.

The acidic solution, containing the 2-(2-dimethylamino-2-methyl-ethyl) - 1 - [1 - (2-pyridyl)-ethyl]-indan-1-ol, is heated on the steam bath for thirty minutes and is then made basic with aqueous ammonia. After extraction with ether the organic layer is separated, dried over sodium sulfate and then evaporated. The remaining residue is distilled under reduced pressure and the fraction, boiling at 165–170°/0.2 mm., is collected. This fraction is a mixture of approximately equal amounts of the two racemates of 2-(2-dimethylamino-2-methyl-ethyl)-3-[1-(2-pyridyl)-ethyl]-indene.

Salts of this mixture can be prepared according to the procedure given in Example 3.

The two racemates of the above mixture of racemates may be separated as follows: 5 g. of the mixture is dissolved in 20 ml. of ethanol and 3 ml. of methyl iodide is added. Within ten minutes one of the racemates of 2-(2-dimethylamino - 2 - methyl-ethyl)-3-[1-(2-pyridyl)-ethyl]-indene methiodide crystallizes and is separated by filtration, M.P. 215° (decomposition). The second racemate methiodide, which is non-crystalline, can be collected by evaporating the solvent. The distillation of the separated methiodides at 170°/0.2 mm. yields the single racemates of 2-(2-dimethylamino-2-methyl-ethyl)-3-[1-(2-pyridyl)-ethyl]-indene.

The starting material used in the above reaction may be prepared as follows: 300 g. of diethyl α-benzyl-malonate is added over a period of thirty minutes to a refluxing suspension of 66 g. of sodium hydride in mineral oil (50% sodium hydride) in 2000 ml. of toluene. After refluxing for one hour a solution of 2-dimethylamino-2-methyl-ethyl chloride in toluene (prepared by dissolving 310 g. of 2-dimethylamino-2-methyl-ethyl chloride hydrochloride in 600 ml. of water, basifying the aqueous solution and extracting it with 1000 ml. of toluene, which solution is dried over sodium sulfate) is added over a period of one hour. After refluxing overnight the reaction mixture is cooled and extracted with aqueous hydrochloric acid. The acidic extract is basified with ammonia and the separating oil is extracted with ether. After drying the ether is evaporated, leaving 396 g. of diethyl α-benzyl - α - (2 - dimethylamino-2-methyl-ethyl)-malonate as a residue.

120 g. of diethyl α-benzyl-α-(2-dimethylamino-2-methyl-ethyl)-malonate is added to 840 g. of polyphosphoric acid at 100° while stirring. The temperature is raised slowly to 150–160° and held for thirty minutes. After treatment with ice water the reaction mixture is made basic with potassium carbonate and extracted with ether. The ether is evaporated to yield a residue containing as the main constituent the 2-(2-dimethylamino-2-methyl-ethyl)-2-carbethoxy-indan-1-one. 75 g. of this residue is refluxed with 650 ml. of 2 N aqueous hydrochloric acid for four hours. The acidic solution is made basic with ammonia, the organic material is extracted with ether, the ether evaporated and the residue distilled at 112–114°/0.23 mm. This fraction is converted to the hydrochloride with ethanolic hydrogen chloride and the crystalline material is recrystallized from ethanol, M.P. 194–196°. This hydrochloride yields the pure 2-(2-dimethylamino-2-methyl-ethyl)-indan-1-one by treatment with ammonia.

*Example 19*

The 3-[(2-pyridyl)-lower alkyl]-2-(tertiary amino-lower alkyl)-indene compounds may be made up into pharmaceutical preparations. Thus, 2-(2-dimethylamino-ethyl)-3-[1-(2-pyridyl)-ethyl]-indene maleate may be formulated into tablets containing 0.002 g. of the anti-histamine compound, as follows (for 2,800 tablets):

| Ingredients: | G. |
|---|---|
| 2 - (2 - dimethylaminoethyl)-3-[1-(2-pyridyl)-ethyl]-indene maleate | 32.000 |
| Lactose spray dried | 2040.000 |
| Stearic acid powder | 14.000 |
| Talcum | 140.000 |
| Corn starch | 140.000 |
| Polyoxyethylene stearate S–D (HLB 1609) | 14.000 |
| Carbowax 6000 micropulverized | 280.000 |
| Confectioners' sugar | 140.000 |

All ingredients are screened through a No. 40 mesh stainless steel screen into a mixer and mixed for thirty minutes. They are compressed into tablets weighing 0.175 g. by employing 10/32" standard concave punches and dies.

Injectable solutions, containing 1 mg./ml. of 2-(2-dimethylaminoethyl)-3-[1-(2-pyridyl)-ethyl] - indene, may be prepared as follows (for 1000 ml.):

Ingredients:

| | | |
|---|---|---|
| 2-(2-dimethylaminoethyl)-3-[1-(2-pyridyl)-ethyl]-indene maleate | g | 1.000 |
| Lactic acid | g | 18.000 |
| Sodium hydroxide | g | 4.140 |
| Sodium chloride | g | 1.520 |
| Sodium sulfite | g | 1.000 |
| Disodium salt of ethylenediamine-tetracetic acid | g | 0.100 |
| Water for injection, q.s | ml | 1000.000 |

The lactic acid and the sodium hydroxide are added to 40 ml. of water for injection, and the disodium salt of ethylenediamine-tetracetic acid, the 2-(2-dimethylaminoethyl)-3-[1-(2-pyridyl)-ethyl]-indene maleate, the sodium chloride and the sodium sulfite are added in this order. Nitrogen gas is passed through the solution for 30 minutes, which is then filtered through a medium porosity sintered glass filter. The solution is filled into ampuls, which are sterilized in an autoclave at 10 pounds per square inch pressure and at 115° C. for thirty minutes.

An additional possibility to introduce a (2-pyridyl)-lower alkyl radical into a 2-(tertiary amino-lower alkyl)-indan-1-one compound comprises reacting the latter with the alkali metal salt of an alkali metal (2-pyridyl)-lower alkanoate, and treating the resulting product with an acid. An alkali metal salt of an alkali metal (2-pyridyl)-lower alkanoate is, for example, the lithium, sodium or potassium salt formed by treating a sodium (2-pyridyl)-lower alkanoate with an alkali metal amide or hydride, e.g. lithium, sodium or potassium amide or hydride, or with a monocyclic aryl alkali metal compound, e.g. phenyl lithium or phenyl sodium, in an inert solvent such as an ether, e.g. p-dioxane, an aromatic hydrocarbon, e.g. benzene, toluene or xylene, or liquid ammonia. The reaction of a 2-(tertiary amino-lower alkyl)-indan-1-one compound with an alkali metal salt of an alkali metal (2-pyridyl)-lower alkanoate is preferably carried out in the presence of a solvent, for example, p-dioxane. A resulting intermediate may not be isolated, but treated directly with an acidic reagent, such as an aqueous solution of an inorganic acid, for example, a mineral acid, e.g. hydrochloric or sulfuric acid, if desired, at an elevated temperature, to yield the desired 3-[(2-pyridyl)-lower alkyl]-2-(tertiary amino-lower alkyl)-indene.

A third generally applicable method to prepare the indene compounds of this invention comprises introducing the tertiary amino group or the tertiary amino-lower alkyl radical into a 2-(reactive esterified hydroxy-lower alkyl)-3-[(2-pyridyl)-lower alkyl]-indene or into a 1-[(2-pyridyl-lower alkyl]-indan-2-one, respectively.

For example, by treating a 2-(reactive esterified hydroxy-lower alkyl)-indene, which contains in the 3-position a (2-pyridyl)-lower alkyl radical, with a secondary amine or a salt thereof, the corresponding 2-(tertiary amino-lower alklyl)-indene compounds of this invention may be formed. A reactive esterified hydroxyl group is, for example, a hydroxyl group esterified with a strong inorganic acid, such as a mineral acid, e.g. hydrochloric, hydrobromic, hydriodic or sulfuric acid. The preferred starting materials are 2-(halogeno-lower alkyl)-indenes, which contain in the 3-position a (2-pyridyl)-lower alkyl radical; secondary amines are those which furnish the tertiary amino groups described in detail hereinabove. The reaction is preferably carried out in the presence of a solvent, such as a lower alkanol, e.g. methanol, ethanol, propanol, isopropanol or higher homologs; a hydrocarbon, such as an aromatic hydrocarbon, e.g. benzene or toluene, or a halogenated aliphatic hydrocarbon, e.g. chloroform, and/or, if desired, in the presence of an acid neutralizing reagent, such as an alkali metal hydroxide, e.g. sodium hydroxide, or an alkali metal carbonate, e.g. sodium or potassium carbonate or hydrogen carbonate. The reaction may be completed by elevating the temperature, for example, to the boiling point of the used solvent.

A 2-(reactive esterified hydroxy-lower alkyl)-indene compound, which contains in the 3-position a (2-pyridyl)-lower alkyl radical, and which is used as the starting material in the above reaction, may be prepared, for example, by reacting an alkali metal, e.g. sodium, salt of an α-benzyl-malonic acid ester, such as one of those outlined hereinbefore, with an etherified hydroxy-lower alkyl halide. An etherified hydroxyl group is particularly a lower alkoxy group, e.g. methoxy or ethoxy, or a monocyclic aryloxy group, e.g. phenoxy; a halide is particularly a chloride or a bromide. The resulting α-benzyl-α-(etherified hydroxy-lower alkyl)-malonic acid ester is then cyclized, if desired, prior to or after hydrolysis and decarboxylation, to a 2-(etherified hydroxy-lower alkyl)-indan-1-one, according to known methods. The (2-pyridyl)-lower alkyl radical is then introduced into the indan-1-one compound according to one of the previously described methods. The resulting 3-[(2-pyridyl)-lower alkyl]-2-(etherified hydroxy-lower alkyl)-indene, which may be obtained after subsequent dehydration of an intermediarily formed indan-1-ol compound, is treated with an ether splitting reagent, for example, a mineral acid, such as a hydrohalic acid, e.g. hydrochloric or hydrobromic acid. The 2-(reactive esterified hydroxy-lower alkyl)-3-[(2-pyridyl)-lower alkyl]-indene may be obtained directly upon treatment with the acid reagent, or may be formed by treatment with a reagent capable of converting a hydroxyl group into a reactive esterified hydroxyl group, for example, with a thionyl halide, e.g. thionyl chloride, which reaction may, if desired, be carried out in an inert solvent, such as an aromatic hydrocarbon, e.g. benzene or toluene.

This reaction and/or the sequence of the steps may be modified; for example, the alkali metal salt of an α-benzyl-malonic acid ester may be treated with a lower alkylene oxide, e.g. ethylene oxide, to form an α-benzyl-α-(hydroxy-lower alkyl)-malonic acid ester, e.g. α-benzyl-α-(2-hydroxyethyl)-malonic acid ester, which may be hydrolyzed, decarboxylized and cyclized to a 2-(hydroxy-lower alkyl)-indan-1-one compound, in which the hydroxy group is separated from the 2-position of the indan nucleus by at least two carbon atoms. A resulting indan-1-one compound is then converted into the desired 2-(reactive esterified hydroxy-lower alkyl)-3-[2-pyridyl)-lower alkyl]-indene derivative, for example, by introducing a (2-pyridyl)-lower alkyl radical according to one of the previously described procedures. The free hydroxyl group is then converted into the reactive esterified hydroxyl group, for example, by treatment with a thionyl halide, e.g. thionyl chloride. These steps may also be performed in reversed order.

Furthermore, certain starting materials of the above reaction may also be obtained by reacting an indan-2-one with an etherified hydroxy-lower alkyl-Grignard reagent, dehydrating the resulting indan-2-ol compound to the 2-(etherified hydroxy-lower alkyl)-indene, into which the (2-pyridyl)-lower alkyl radical may be introduced according to one of the previously outlined procedures. The ether group may then be split by treatment with an acid; the resulting free hydroxyl group is converted into a reactive esterified hydroxyl group, and any additional double bond present may be reduced; these steps may be carried out in any order.

A tertiary amino-lower alkyl group may be introduced into a 1-[(2-pyridyl)-lower alkyl]-indan-2-one compound according to previously described methods, which are used for the introduction of a (2-pyridyl)-lower alkyl radical into a 2-(tertiary amino-lower alkyl)-indan-1-one. For example, the indan-2-one compound may be reacted with a tertiary amino-lower alkyl metal halide according to the Grignard procedure, and a resulting 1-[(2-pyridyl)-lower alkyl]-2-(tertiary amino-lower alkyl)-indan-2-ol may be converted into the desired indene compound by dehydration, for example, with an acid, such dehydration being carried out according to previously described methods.

The 1-[(2-pyridyl)-lower alkyl]-indan-2-ones, which are used as starting materials in the above reaction may be prepared by introducing into an indan-2-one the (2-pyridyl)-lower alkyl radical according to previously described procedures. For example, by reacting a 2-pyridine carboxaldehyde with an indan-2-one compound in the presence of a base a 1-[(2-pyridyl)-methyl-idene]-indan-2-one may be obtained, which may be converted into the desired 1-[(2-pyridyl)-methylidene]-indan-2-one by reductive removal of the double bond, if desired, with subsequent reoxidation of any reduced oxo group.

The 3-[(4-pyridyl)-lower alkyl]-2-(tertiary amino-lower alkyl)-indenes may be obtained according to the above procedures by using the appropriate starting materials yielding such 4-pyridyl derivatives. Or, reactants containing 3-pyridyl radicals may be utilized to prepare the desired 3-[(3-pyridyl)-lower alkyl]-2-(tertiary amino-lower alkyl)-indenes.

In the resulting indene compounds functional groups attached to the aromatic portion of the indene nucleus may be converted into other functional groups: a nitro group may be reduced to an amino group; a nitro or a primary amino group may be reductively alkylated to form secondary or tertiary amino groups; an amino group may be diazotized and converted to halogen according to the Sandmeyer method; a hydroxyl group may be etherified, for example, by treatment with a diazo-lower alkane, e.g. diazomethane, or esterified to a lower alkanoyloxy group, for example, with acetyl chloride to an acetoxy group, etc.

What is claimed is:

1. 2-(N,N-di-lower alkyl-amino-lower alkyl)-1-[(3-pyridyl)-methylidene]-indene.

2. 2 - (2-dimethylaminoethyl)-1-[(3-pyridyl)-methylidene]-indene.

3. 2 - (N,N-di-lower alkyl-amino-lower alkyl)-1-[(2-pyridyl)-methylidene]-indene.

4. 2 - (N,N-di-lower alkyl-amino-lower alkyl)-1-[(4-pyridyl)-methylidene]-indene.

5. Process for the preparation of 2-(N,N-di-lower alkyl - amino-lower alkyl)-3-[(2-pyridyl)-methyl]-indene, which comprises reacting 2-(N,N-lower alkyl-amino-lower alkyl)-indene with pyridine-2-carboxaldehyde in the presence of an alkali metal salt-forming condensing reagent selected from the group consisting of alkali metal hydroxide, alkali metal lower alkanolate, alkali metal hydride, alkali metal amide and quaternary ammonium hydroxide and reducing the resulting product with one mole of hydrogen in the presence of a palladium hydrogenation catalyst.

6. Process according to claim 5, which comprises using palladium on charcoal as the palladium catalyst.

7. Process for the preparation of 2-(N,N-di-lower alkyl - amino-lower alkyl)3-[(3-pyridyl)-methyl]-indene, which comprises reacting 2-(N,N-di-lower alkyl-amino-lower alkyl)-indene with pyridyl-3-carboxaldehyde in the presence of an alkali metal salt-forming condensing reagent selected from the group consisting of alkali metal hydroxide, alkali metal lower alkanolate, alkali metal hydride, alkali metal amide and quaternary ammonium hydroxide and reducing the resulting product with one mol and hydrogen in the presence of a palladium hydrogenation catalyst.

8. Process for the preparation of 2-(N,N-di-lower alkyl- amino - lower alkyl)-3-[(4-pyridyl)-methyl]-indene, which comprises reacting 2-(N,N-lower alkyl-amino-lower alkyl)-indene with pyridine-4-carboxaldehyde in the presence of an alkali metal salt-forming condensing reagent selected from the group consisting of alkali metal hydroxide, alkali metal lower alkanolate, alkali metal hydride, alkali metal amide and quaternary ammonium hydroxide and reducing the resulting product with one mol of hydrogen in the presence of a palladium hydrogenation catalyst.

References Cited in the file of this patent

UNITED STATES PATENTS

| 2,441,069 | Hoffman et al. | May 4, 1948 |
| 2,947,756 | Huebner | Aug. 2, 1960 |

OTHER REFERENCES

Ziegler et al: Chem. Abstracts, vol. 28, col. 5413 (1934).

Adkins: Reactions of Hydrogen (Univ. of Wisconsin Press), pp. 127–128 (1946).

Tilford et al.: Chem. Abstracts, vol. 49, col. 8959 (1955).